US007130998B2

(12) United States Patent
Balfanz et al.

(10) Patent No.: US 7,130,998 B2
(45) Date of Patent: Oct. 31, 2006

(54) USING A PORTABLE SECURITY TOKEN TO FACILITATE CROSS-CERTIFICATION BETWEEN CERTIFICATION AUTHORITIES

(75) Inventors: Dirk Balfanz, Redwood City, CA (US); Glenn E. Durfee, San Francisco, CA (US); Diana K. Smetters, San Francisco, CA (US)

(73) Assignee: Palo Alto Research Center, Inc., Palo Alto, CA (US)

( * ) Notice: Subject to any disclaimer, the term of this patent is extended or adjusted under 35 U.S.C. 154(b) by 187 days.

(21) Appl. No.: 10/966,749

(22) Filed: Oct. 14, 2004

(65) Prior Publication Data

US 2006/0085633 A1    Apr. 20, 2006

(51) Int. Cl.
*H04L 9/00* (2006.01)
(52) U.S. Cl. .................. 713/155; 713/156; 713/159
(58) Field of Classification Search ................ 713/155, 713/156, 159
See application file for complete search history.

(56) References Cited

OTHER PUBLICATIONS

Public-key infrastructure interoperation Ford, W.; Aerospace Conference, 1998. Proceedings., IEEE vol. 4, Mar. 21-28, 1998 pp. 329-333 vol. 4.*
Interoperability among healthcare organizations acting as certification authorities Bourka, A.; Polemi, D.; Koutsouris, D.; Information Technology in Biomedicine, IEEE Transactions on vol. 7, Issue 4, Dec. 2003 pp. 364-377.*
A Description Logic for PKI Trust Domain Modeling Haibo Yu; Chunzhao Jin; Haiyan Che; Information Technology and Applications, 2005. ICITA 2005. Third International Conference on vol. 2, Jul. 4-7, 2005 pp. 524-528.*
Menezes, Oorschot, Vanstone: "Handbook of Applied Cryptography", CRC Press Series on Discrete Mathmatics and it Applications, pp. 570-576, XP002370863.
Girardot Y: "Bull CP8 Smart Card Uses in Cryptology", Advances In Cryptology-Eurocrypt84, International Conference on the Theory and Application of Cryptographic Techniques, Springer Verlag, DE, Apr. 11, 1984, pp. 464-469, XP002185511.
Schneier B: "Applied Cryptopgraphy, Protocols, Algorithms, and Source Code in C", Applied Cryptography. Protocols, Algorithms, and Source Code in C, New York, John Wiley & Sons, US, 1996, pp. 584-587, XP002370864.

* cited by examiner

*Primary Examiner*—David Jung
(74) *Attorney, Agent, or Firm*—Park, Vaughn & Fleming LLP

(57) ABSTRACT

One embodiment of the present invention provides a system that uses a portable security token (PST) to facilitate cross-certification between a first certification authority (CA) and a second CA, wherein the first CA and associated subscriber devices constitute a first public-key infrastructure (PKI) domain, and wherein the second CA and associated subscriber devices constitute a second PKI domain. During operation, the system uses the PST to transfer certification information between the first CA and the second CA, wherein the PST communicates with the first CA and the second CA through a location-limited communication channel. Next, the system uses the certification information to issue a cross-certificate to the first CA. Note that the cross-certificate is signed by the second CA. Finally, the system propagates the cross-certificate from the first CA to the associated subscriber devices in the first PKI domain, thereby allowing the associated subscriber devices in the first PKI domain to authenticate themselves to the devices in the second PKI domain.

27 Claims, 6 Drawing Sheets

USING A PORTABLE SECURITY TOKEN TO FACILITATE CROSS-CERTIFICATION BETWEEN CERTIFICATION AUTHORITIES

RELATED APPLICATION

The subject matter of this application is related to the subject matter in a co-pending non-provisional application by inventors, Dirk Balfanz, Glenn E. Durfee and Diana K. Smetters, entitled, "Using a Portable Security Token to Facilitate Public Key Certification for Devices in a Network," having Ser. No. 10/877,477, and filing date 24 Jun. 2004.

BACKGROUND

1. Field of the Invention

The present invention relates to mechanisms for providing security in networked computing systems. More specifically, the present invention relates to a method and an apparatus that uses a portable security token (PST) to facilitate cross-certification between certification authorities (CAs) associated with separate public-key infrastructure (PKI) domains.

2. Related Art

Public key cryptography provides a powerful tool that can be used to encrypt data and to authenticate digital signatures. However, widespread use of public key cryptography requires that a practical solution be found for the problem of associating public keys with their owners in a trusted (authenticated) manner.

One solution to this problem is to construct a Public Key Infrastructure (PKI). A PKI supports a collection of well-known trusted public keys, which can be hierarchically organized. In a PKI, the owner of a trusted key is usually referred to as a "Certification Authority," or "CA." A CA can use a private key corresponding to its trusted public key to authenticate the keys of other members (users and devices) in the PKI by signing the keys for the members, and creating "digital certificates." A digital certificate typically links a public key to information indicating who owns the key (an identity certificate), or what the key is allowed to be used for (an attribute certificate), or at a minimum, that the bearer of the corresponding private key is a valid member of this particular PKI or some other trust system. A PKI simplifies the key management problem because it eliminates the need to exchange keys between all the members of a trusted network. Instead, in a PKI, only the trusted public keys need to be publicized.

It was initially envisioned that a single "global" PKI would eventually be adopted, which would enable any device on the Internet to authenticate itself to any other device on the Internet. Unfortunately, such a global PKI has not been adopted. Instead, there presently exist many separate PKI domains. For example, a separate PKI domain often exists for computing devices within a company or within a governmental organization. Because of absence of a single global PKI, it is difficult for devices on the Internet to establish trust with other devices on the Internet.

A number of schemes have been developed to enable devices from different PKI domains to interoperate with each other. In particular, a technique known as "cross-certification" allows two separate PKI domains to be merged into a single combined PKI domain. For example, consider a scenario with two PKI domains: a first PKI domain, with an associated first root CA, and a second PKI domain, with an associated second root CA. In the cross-certification process, the second root CA issues a "cross-certificate" to the first root CA. The cross-certificate is then propagated to devices in the first PKI domain, thereby allowing these devices to authenticate themselves to devices in the second PKI domain. In addition, cross-certification can also take place in the other direction, in which the first root CA issues a cross-certificate to the second root CA, thereby achieving full cross-certification.

Unfortunately, cross-certification is a complicated and time-consuming process. Cross-certification typically requires a meeting between administrators of the different domains, and certification information has to somehow be transferred securely between the root CAs for the different domains. Note that secure communications between the root CAs cannot take place across a public network, such as the Internet, until the cross-certificate is completed. Consequently, the certification information has to be exchanged through some other communication channel. For example, disks carrying this certification information can be hand-carried between the CAs.

Hence, what is needed is a method and an apparatus that simplifies the process of performing cross-certification between different PKI domains.

SUMMARY

One embodiment of the present invention provides a system that uses a portable security token (PST) to facilitate cross-certification between a first certification authority (CA) and a second CA, wherein the first CA and associated subscriber devices constitute a first public-key infrastructure (PKI) domain, and wherein the second CA and associated subscriber devices constitute a second PKI domain. During operation, the system uses the PST to transfer certification information between the first CA and the second CA, wherein the PST communicates with the first CA and the second CA through a location-limited communication channel. Next, the system uses the certification information to issue a cross-certificate to the first CA. Note that the cross-certificate is signed by the second CA. Finally, the system propagates the cross-certificate from the first CA to the associated subscriber devices in the first PKI domain, thereby allowing the associated subscriber devices in the first PKI domain to authenticate themselves to the devices in the second PKI domain.

In a variation on this embodiment, the system also uses the certification information to issue a cross-certificate to the second CA. Note that the cross-certificate is signed by the first CA. The system also propagates the cross-certificate from the second CA to associated subscriber devices in the second PKI domain, thereby allowing the associated subscriber devices in the second PKI domain to authenticate themselves to devices in the first PKI domain.

In a variation on this embodiment, the cross-certificate issued to the first CA delegates limited access rights to devices in the first PKI domain during interactions with devices in the second PKI domain.

In a variation on this embodiment, the act of using the PST to transfer certification information between the first CA and the second CA involves: installing the public key of the first CA on the PST; moving the PST in close physical proximity to the second CA; and communicating the public key of the first CA to the second CA through the location-limited communication channel. Furthermore, the act of using the certification information to issue a cross-certificate to the first CA involves: creating the cross-certificate at the second CA by using the private key of the second CA to sign the public key of the first CA; and communicating the cross-certificate from the second CA to the first CA.

In a variation on this embodiment, the act of using the PST to transfer certification information between the first CA and the second CA involves: installing the private key of the second CA on the PST; and moving the PST in close physical proximity to the first CA. Furthermore, the act of using the certification information to issue a cross-certificate to the first CA involves: receiving the public key of the first CA at the PST through the location-limited communication channel; creating the cross-certificate at the PST by signing the public key of the first CA with the private key of the second CA; and then communicating the cross-certificate from the PST to the first CA.

In a variation on this embodiment, the act of using the PST to transfer certification information between the first CA and the second CA involves: causing the second CA and the PST to agree upon a secret key, and bringing the PST in close physical proximity to the first CA. Furthermore, the act of using the certification information to issue a cross-certificate to the first CA involves: receiving an authenticator for the first CA at the PST through the location-limited communication channel; forming a ticket by signing the authenticator with the secret key previously agreed upon by the PST and the second CA; and communicating the ticket from the PST to the first CA. In this way, the first CA can subsequently present the ticket to the second CA to prove that the first CA is authorized to receive a cross-certificate from the second CA.

In a variation on this embodiment, issuing the cross-certificate to the first CA also involves communicating a root certificate for the second CA to the first CA.

In a variation on this embodiment, the first CA maintains a certificate revocation list (CRL), which is accessible by devices in the second PKI domain. This enables the first CA to revoke credentials for devices in the first PKI domain, and wherein the revocations are visible to devices in the second PKI domain.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

PKI Domains

Figure 1:
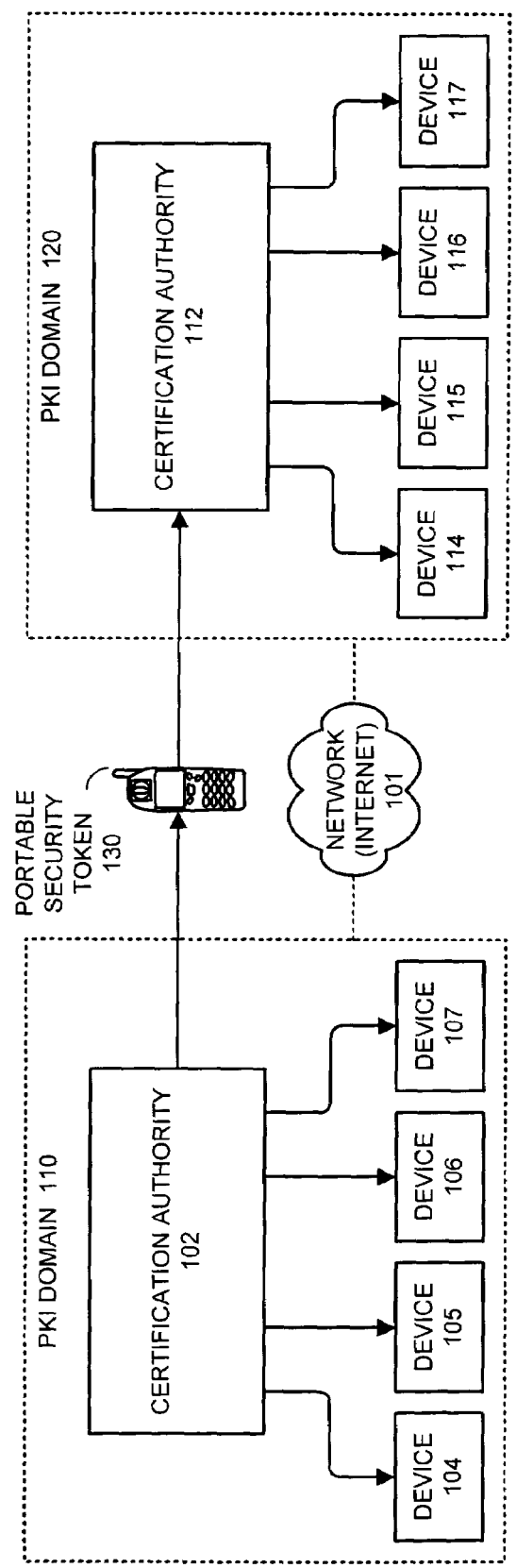
FIG. 1 illustrates two separate PKI domains that perform cross-certification operations through a PST in accordance with an embodiment of the present invention.

FIG. 1 illustrates two separate PKI domains 110 and 120 that perform cross-certification operations through a PST 130 in accordance with an embodiment of the present invention.

PKI domains 110 and 120 each include a CA and associated subscriber devices. More specifically, a first PKI domain 110 includes a first CA 102 and associated subscriber devices 104–107, and a second PKI domain 120 includes a second CA 112 and associated subscriber devices 114–117.

CAs 102 and 112 can include any computational device that can perform certification authority functions for devices on respective local networks. Note that these local networks can include any type of wired or wireless network that allows the CAs to communicate with their respective subscriber devices.

Subscriber devices 104–107 and 114–117 can include any computational device or appliance that can make use of a credential during interactions with other devices over a network.

Devices in the first PKI domain 110 are able to communicate with devices in the second PKI domain 120 through network 101. Network 101 can generally include any type of wire or wireless communication channel capable of coupling together computing nodes. This includes, but is not limited to, a local area network, a wide area network, or a combination of networks. In one embodiment of the present invention, network 101 includes the Internet.

During the cross-certification process, portable security token (PST) 130 is used to transfer certification information between the first CA 102 (in the first PKI domain 110) and the second CA 112 (in the second PKI domain 120).

PST 130 can include any type of portable device that can communicate with network devices through a location-limited communication channel. For example, PST 130 can include, but is not limited to, a cell phone, a smart card, a personal digital assistant (PDA), a laptop computer, or a hand-held remote control device.

The location-limited communication channel used by PST 130 can include: a communication channel that uses visible or invisible electromagnetic radiation communication, such as an infrared communication channel; a communication channel through a short run of wires; an audio communication channel (either audible or inaudible); a physical electrical contact; a short range RF channel; a near-field signaling channel; and a communication channel that operates by passing information from one device to another device through a physical computer-readable media, such as a removable disk, a USB storage device, a flash memory pen, or other tangible data carrier.

This location-limited communication channel ideally has the "demonstrative identification property," which means that human operators are aware of which devices are communicating with each other over the channel, which enables the human operators to easily detect when an attack is being made on the channel.

This location-limited communication channel also ideally has the "authenticity property," which means that it is impossible or difficult for an attacker to transmit over the channel or tamper with messages sent over the channel without being detected by the legitimate parties to the communication. Note that it is not necessary for the channel to provide secrecy. Hence, an attacker can monitor the transmissions on the channel, so long as the attacker cannot transmit on the channel without detection.

Note that because of the location-limited nature of the channel, it is difficult for an attacker to monitor the channel, let alone transmit on the channel without detection. Furthermore, detection only requires that the human participants know the number of the participants (devices) who are communicating over the channel.

In one embodiment of the present invention, PST 130 functions like an infrared television remote control. In this embodiment, a human operator located in close proximity to a target device points PST 130 at the target device and presses a button to initiate communications between PST 130 and the target device.

Interactions between PST 130, first CA 102 and second CA 112 are described in more detail below with reference to FIGS. 2–5.

Cross-Certification by Using a PST to Transfer a Public Key

Figure 2:
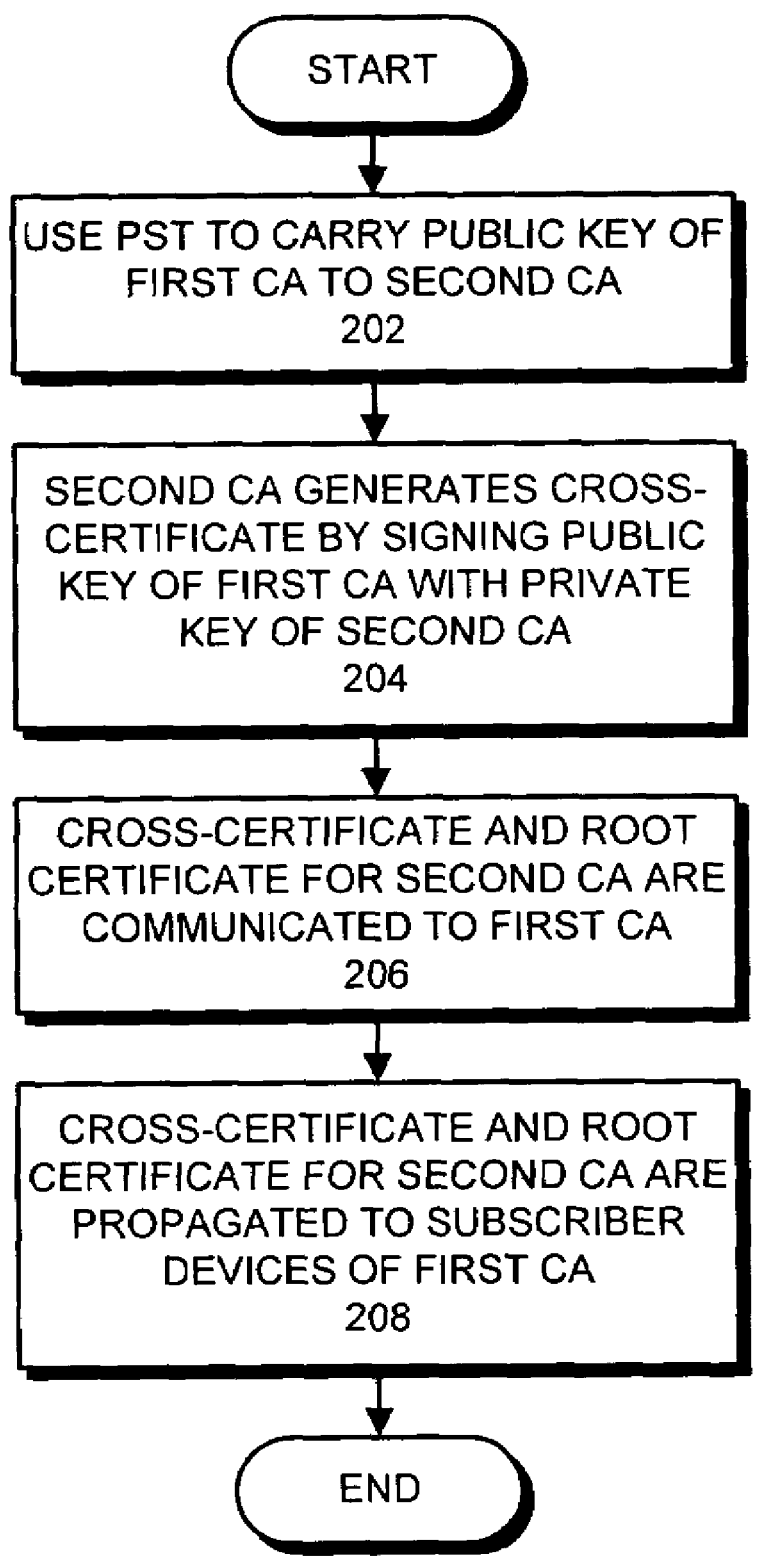
FIG. 2 presents a flow chart of a technique for performing cross-certification between PKI domains by using a PST to carry a public key in accordance with an embodiment of the present invention.

FIG. 2 presents a flow chart of a technique for performing cross-certification between PKI domains by using a PST to transfer a public key in accordance with an embodiment of the present invention. Referring to FIG. 1, the system starts with a first PKI domain 110, which is associated with a first CA 102, and a second PKI domain 120, which is associated with a second CA 112.

During the cross-certification process, PST 130 is used to carry a public key for the first CA 102 to the second CA 112 (step 202). This can involve: moving PST 130 in close physical proximity to the first CA 102; communicating the public key from the first CA 102 to PST 130 through the location-limited communication channel; moving PST 130 in close physical proximity to the second CA 112; and communicating the public key from PST 130 to the second CA 112 through the location-limited communication channel.

Next, the second CA 112 generates a cross-certificate by signing the public key of the first CA 102 with the private key of the second CA 112 (step 204).

Then the cross-certificate is communicated back the first CA 102 along with the root certificate of the second CA 112 (step 206). This communication can take place through PST 130, which involves carrying PST 130 back to the first CA 102. Alternatively, this communication can take place across a public network 101.

Next, after the cross-certificate and the root certificate of the second CA 112 are installed on first CA 102, the cross-certificate and root certificate are propagated to subscriber devices 104–107 within PKI domain 110 (step 208). This cross-certificate allows devices subscriber devices 104–107 in the first PKI domain 110 to authenticate themselves to devices in the second PKI domain 120.

This type of cross-certification wherein one PKI domain trusts another PKI domain, but not vice versa is referred to as "unilateral cross-certification." Note that to achieve full bilateral cross-certification, the above-described process can be repeated in the opposite direction to allow subscriber devices 114–117 in the second PKI domain 120 to authenticate themselves to devices in the first PKI domain 110. (Moreover, note that by using some of the below-described techniques in combination, full bilateral cross-certification can be achieved through one-way travel of a PST between PKI domains 110 and 120.)

Cross-Certification by Using a PST to Transfer a Private Key

Figure 3:
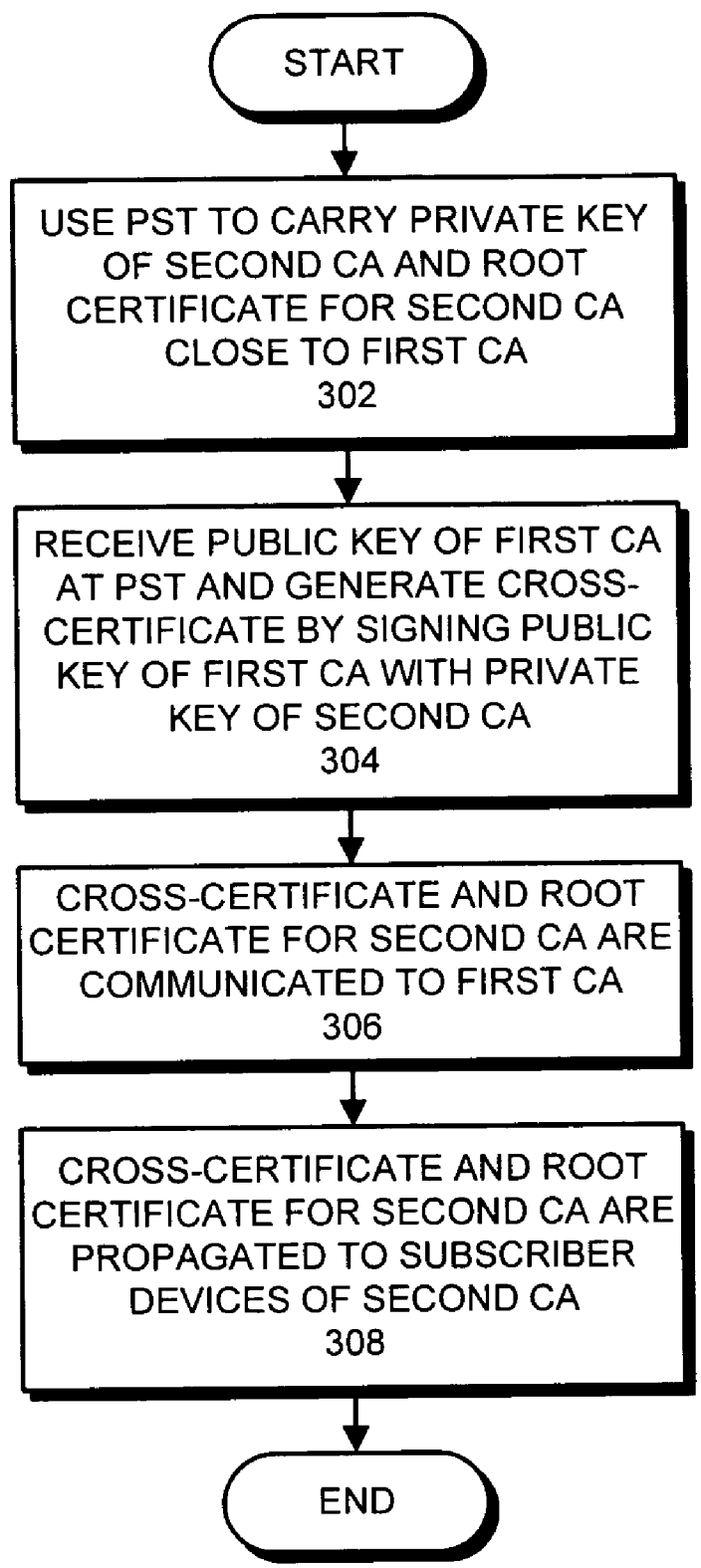
FIG. 3 presents a flow chart of another technique for performing cross-certification between PKI domains by using a PST to carry a private key in accordance with an embodiment of the present invention.

FIG. 3 presents a flow chart illustrating another technique for performing cross-certification between PKI domains by using a PST to carry a private key in accordance with an embodiment of the present invention.

During this cross-certification process, PST 130 is used to carry a private key for the second CA 112 and the root certificate of the second CA 112 to in close proximity to the first CA 102 (step 302). In one embodiment of the present invention, this involves: moving PST 130 in close physical proximity to the second CA 112; communicating the private key (and the root certification for of the second CA 112) from the second CA 112 to PST 130 through the location-limited communication channel; and moving PST 130 in close physical proximity to the first CA 102.

Next, PST 130 receives the public key of the first CA 102 through the location-limited communication channel and generates a cross-certificate by signing the public key of the first CA 102 with the private key of the second CA 112 (step 304).

Next, the cross-certificate and the root certificate for the second CA 112 are communicated back to the first CA 102 (step 306). This communication can take place through the location-limited communication channel, or alternatively through a public network.

Finally, after the cross-certificate and the root certificate of the second CA 112 are installed on the first CA 102, the cross-certificate and root certificate are propagated to subscriber devices 104–107 within PKI domain 110 (step 308). This cross-certificate allows devices subscriber devices 104–107 in the first PKI domain 110 to authenticate themselves to devices in the second PKI domain 120. Note that to achieve full cross-certification, the above-described process can be repeated in the opposite direction to allow subscriber devices 114–117 in the second PKI domain 120 to authenticate themselves to devices in the first PKI domain 110.

Using a Ticket During the Cross-Certification Process

Initial Communications with PST

Figure 4A:
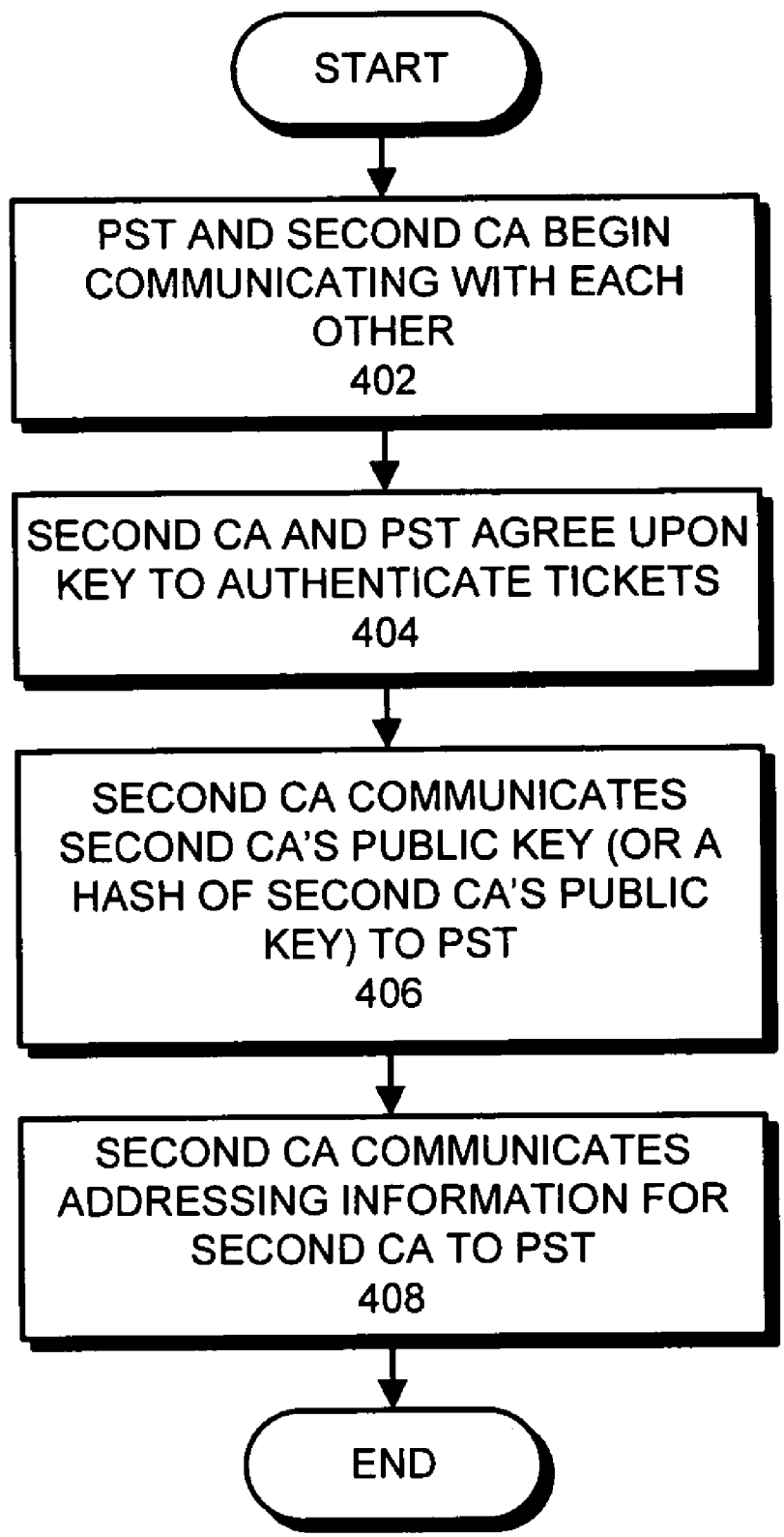
FIG. 4A presents a first flow chart for another technique that uses a PST to generate a ticket during the cross-certification process in accordance with an embodiment of the present invention.

FIG. 4A presents a first flow chart for another technique that uses a PST to generate a ticket during the cross-certification process in accordance with an embodiment of the present invention. First, PST 130 and the second CA 112 begin communicating with each other (step 402). This communication can take place in a number of ways. For example, PST 130 and the second CA 112 can be brought into close proximity to each other so that PST 130 and the second CA 112 can communicate through a location-limited communication channel. Alternatively, PST 130 and the second CA 112 can communicate through a direct wired connection, or PST 130 can communicate with the second CA 112 though a public network.

PST 130 and the second CA 112 can then (optionally) authenticate each other before proceeding. Next, the second CA 112 and PST 130 agree upon a key that PST 130 will subsequently use to authenticate tickets for network devices (step 404). In one embodiment of the present invention, this key is a secret symmetric key that is known only by the second CA 112 and PST 130. In another embodiment, PST 130 receives a digital certificate issued by the second CA 112, and PST 130 uses its corresponding private key, which is associated with this digital certificate, to sign tickets.

The second CA 112 also communicates its public key (or a hash of its public key) to PST 130 (step 406) and its root certificate, as well as addressing information (such as an Internet Protocol (IP) address of the CA) (step 408).

At this point, PST 130 is ready to issue tickets.

Receiving a Ticket for a Cross-Certificate

Figure 4B:
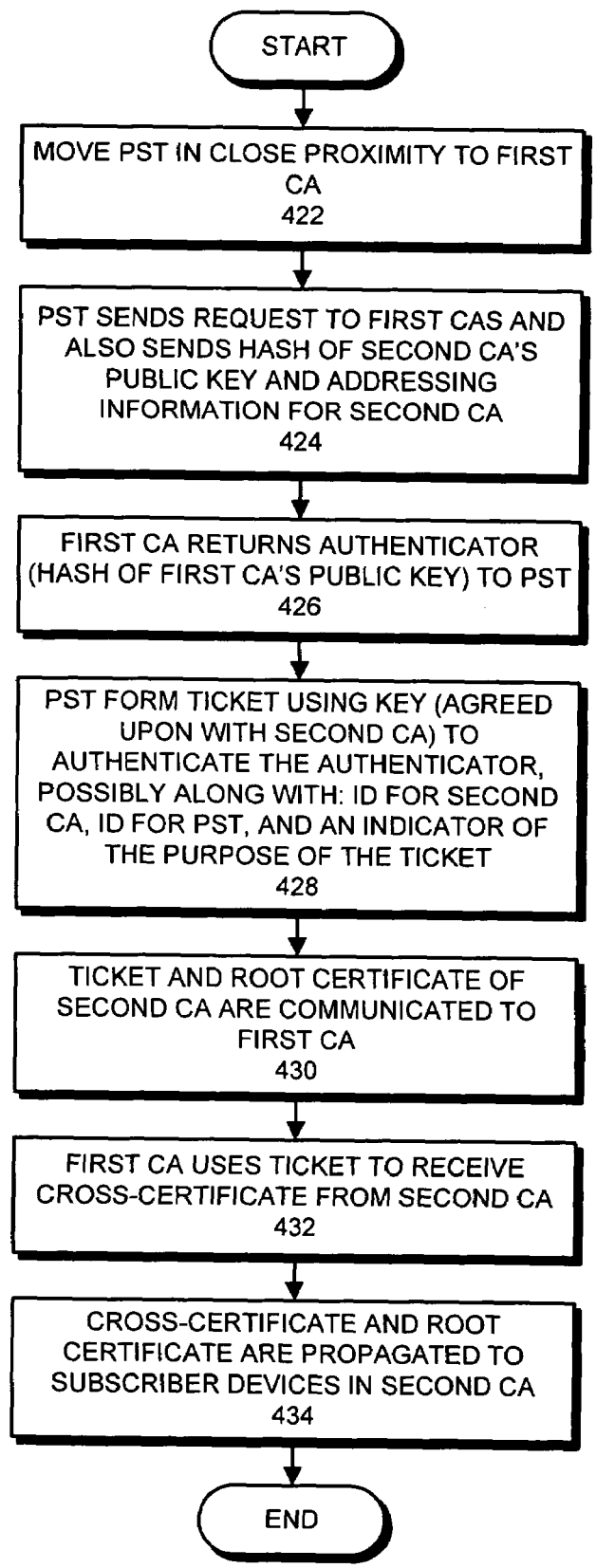
FIG. 4B presents second flow chart for the technique that uses a PST to generate a ticket in accordance with an embodiment of the present invention.

FIG. 4B presents second flow chart for the technique that uses a PST to generate a ticket in accordance with an embodiment of the present invention. After step 408 above, PST 130 is moved in close proximity to the first CA 102 (step 422), thereby allowing PST 130 to communicate with the first CA 102 through the location-limited communication channel.

During these communications, PST 130 sends an initial request to the first CA 102 (step 424). This initial request (or possibly a subsequent message) can include the second CA 112's public key (or a hash of the second CA 112's public key) and addressing information for the second CA 112 to enable the first CA 102 to subsequently communicate with and authenticate the second CA 112.

In response to this request, the first CA 102 returns an authenticator to PST 130 (step 426). This authenticator is a cryptographic token that can be used in a subsequent protocol between the first CA 102 and the second CA 112 to prove that the cryptographic token originated from the first CA 102. For example, the authenticator can be, the first CA 102's public key, a hash of the first CA 102's public key, or a hash of a secret known only by the first CA 102.

Next, PST 130 forms a ticket by digitally signing authenticator (step 428). Note that in addition to the authenticator, the ticket can also include: an identifier for the second CA 112 and an identifier for PST 130, and an indicator of the purpose of the ticket. Moreover, the authentication process involves using the key that was previously agreed upon between PST 130 and the second CA 112.

Next, the ticket and the root certificate for the second CA 12 are communicated to the first CA 102 (step 430). This communication takes place through the location-limited communication channel.

The first CA 102 can subsequently present the ticket to the second CA 112 to prove that the first CA 102 is authorized to receive a cross-certificate from the second CA 112 (step 432). This process is described in more detail below with reference to FIG. 5.

Next, after the cross-certificate and the root certificate of the second CA 112 are installed on the first CA 102, the cross-certificate and root certificate are propagated to subscriber devices 104–107 within PKI domain 110 (step 434). This cross-certificate allows devices subscriber devices 104–107 in the first PKI domain 110 to authenticate themselves to devices in the second PKI domain 120. Note that to achieve full cross-certification, the above-described process can be repeated in the opposite direction to allow subscriber devices 114–117 in the second PKI domain 120 to authenticate themselves to devices in the first PKI domain 110.

Using a Ticket to Obtain a Cross-Certificate

Figure 4C:
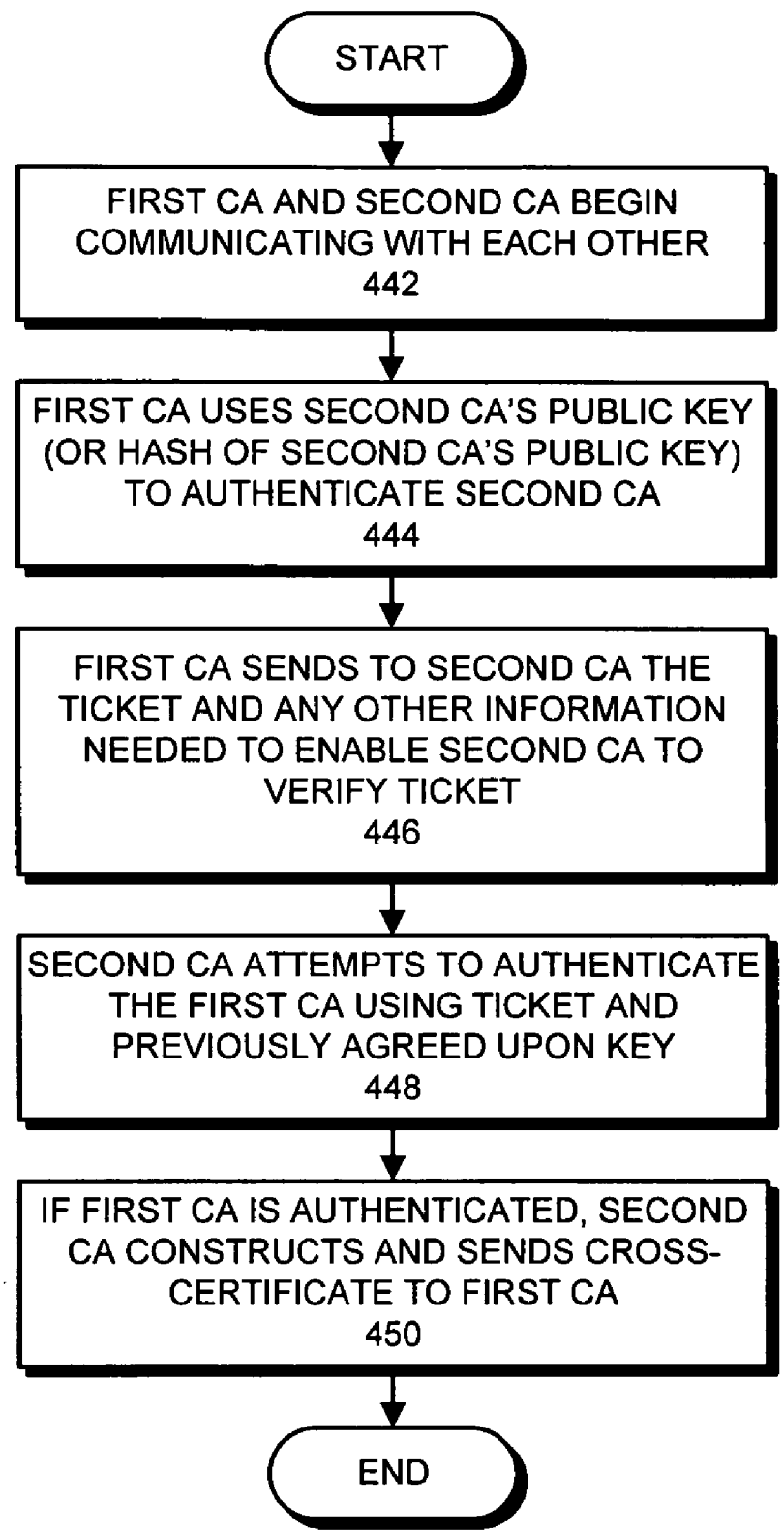
FIG. 4C presents a third flow chart for the technique that uses a PST to generate a ticket in accordance with an embodiment of the present invention.

FIG. 4C presents a flow chart illustrating how a ticket is used to obtain a cross-certificate in accordance with an embodiment of the present invention. At the start of this process, the first CA 102 and the second CA 112 begin communicating with each other through any one of a number of communication channels (step 442). For example, the first CA 102 can use the addressing information for the second CA 112 (obtained from PST 130) to begin communicating with the second CA 112 though a public network 101.

Next, the first CA 102 uses the second CA 112's public key (or a hash of the second CA 112's public key) previously obtained from PST 130 to authenticate the second CA 112 (step 444). This can be accomplished using well-known authentication techniques. For example, the first CA 102 can cause the second CA 112 to sign some piece of information with the second CA 112's private key. The first CA 102 can then use the second CA 112's public key to verify that the information was signed by the second CA 112's private key. Note that if the first CA 102 only possesses the hash of the second CA 112's public key, the first CA 102 must first obtain the second CA 112's public key from the second CA 112.

Once the first CA 102 has authenticated the second CA 112, the first CA 102 sends the ticket, along with other information needed to verify the ticket, to the second CA 112 (step 446). This other information needed to verify the ticket can include, the pre-image of the authenticator (if one exists). For example, if the authenticator is a hash of the first CA 102's public key, the pre-image would be the first CA 102's public key in un-hashed form.

Similarly, if the authenticator is a hash, H(S), of a secret, S, known only to the first CA 102, the pre-image would be the secret, S. In this case, the secret, S, is ideally sent to the CA through a secure encrypted tunnel, such as an SSL connection, which is established between the first CA 102 and the second CA 112.

Next, the second CA 112 attempts to authenticate the first CA 102 using the ticket, the pre-image of the authenticator (if one exists) and the previously agreed upon key (step 448). This involves verifying the ticket was signed with the previously agreed upon key and also verifying that the pre-image of the authenticator (if one exists) is consistent with the authenticator.

If the first CA 102 is successfully authenticated, the second CA 112 constructs and sends a cross-certificate to the first CA 102 (step 450).

Revocation

Since the present invention is PKI-based, it gains the benefits of per-device revocation. For instance, if a device in the first PKI domain 110 is lost or stolen, its credentials can be individually revoked to prevent unauthorized access to devices in the second PKI domain 120. To make this happen, the second PKI domain 120 must have access to up-to-date certificate revocation list (CRL) information maintained by the first CA 102. This can be accomplished by pushing the address for CRLs to the second PKI domain 120 via communication through PST 130 or through direct communication with first CA 102. Furthermore, the CRL location can be included in certificates used in exchanges between the second CA 112 and its associate subscriber devices 114–117.

Limited Delegation

In one embodiment of the present invention, the cross-certificate issued to the first CA 102 delegates limited access rights to devices in the first PKI domain 110 during interactions with devices in the second PKI domain 120. For example, if the first CA 102 is integrated with devices in a home security and locking system, the user could use the PST 130 to delegate limited access to his home. This limited access can give a plumber the ability to open his door for a 4-hour period of time to fix his sink, or can allow the user's cat sitter access to not only enter the house and feed the cats, but to access the home video system over the internet, and monitor the cats remotely as well. After the first time that particular cat sitter was given a limited-access credential by the first CA 102 (via close physical proximity of PST 130), the first CA 102 would be able to remember the cat sitter's public key, and could allow the user to enable access for the cat sitter during the user's next vacation, simply by running a "vacation preparation" application and selecting "allow usual cat sitter" from a to-do list. Such limited delegation could be used on a longer-term basis to monitor elderly relatives remotely, etc.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for using a portable security token to facilitate cross-certification between a first certification authority (CA) and a second CA, comprising:
    using the portable security token to transfer certification information between the first CA and the second CA, wherein the first CA and associated subscriber devices constitute a first public-key infrastructure (PKI) domain, wherein the second CA and associated subscriber devices constitute a second PKI domain, and wherein the portable security token communicates with the first CA and the second CA through a location-limited communication channel;
    using the certification information to issue a cross-certificate to the first CA signed by the second CA; and
    propagating the cross-certificate from the first CA to associated subscriber devices in the first PKI domain, thereby allowing the associated subscriber devices in the first PKI domain to authenticate themselves to devices in the second PKI domain.

2. The method of claim 1, further comprising:
    using the certification information to issue a cross-certificate to the second CA signed by the first CA; and
    propagating the cross-certificate from the second CA to associated subscriber devices in the second PKI domain, thereby allowing the associated subscriber devices in the second PKI domain to authenticate themselves to devices in the first PKI domain.

3. The method of claim 1, wherein the cross-certificate issued to the first CA delegates limited access rights to devices in the first PKI domain during interactions with devices in the second PKI domain.

4. The method of claim 1,
    wherein using the portable security token to transfer certification information between the first CA and the second CA involves,
        installing the public key of the first CA on the portable security token,
        moving the portable security token in close physical proximity to the second CA, and
        communicating the public key of the first CA to the second CA through the location-limited communication channel; and
    wherein using the certification information to issue a cross-certificate to the first CA involves,
        creating the cross-certificate at the second CA by using the private key of the second CA to sign the public key of the first CA, and
        communicating the cross-certificate from the second CA to the first CA.

5. The method of claim 1,
    wherein using the portable security token to transfer certification information between the first CA and the second CA involves,
        installing the private key of the second CA on the portable security token, and
        moving the portable security token in close physical proximity to the first CA; and
    wherein using the certification information to issue a cross-certificate to the first CA involves,
        receiving the public key of the first CA at the portable security token through the location-limited communication channel,
        creating the cross-certificate at the portable security token by signing the public key of the first CA with the private key of the second CA, and
        communicating the cross-certificate from the portable security token to the first CA.

6. The method of claim 1,
    wherein using the portable security token to transfer certification information between the first CA and the second CA involves,
        causing the second CA and the portable security token to agree upon a secret key, and
        bringing the portable security token in close physical proximity to the first CA; and
    wherein using the certification information to issue a cross-certificate to the first CA involves,
        receiving an authenticator for the first CA at the portable security token through the location-limited communication channel,
        forming a ticket by signing the authenticator with the secret key previously agreed upon by the portable security token and the second CA, and
        communicating the ticket from the portable security token to the first CA, whereby the first CA can subsequently present the ticket to the second CA to prove that the first CA is authorized to receive a cross-certificate from the second CA.

7. The method of claim 1,
    wherein using the portable security token to transfer certification information between the first CA and the second CA involves,
        causing the portable security token to receive a digital certificate issued by the second CA, and
        bringing the portable security token in close physical proximity to the first CA; and
    wherein using the certification information to issue a cross-certificate to the first CA involves,
        receiving an authenticator for the first CA at the portable security token through the location-limited communication channel, forming a ticket by signing the authenticator with a private key of the PST, which is associated with the digital certificate, and communicating the ticket from the portable security token to the first CA, whereby the first CA can subsequently present the ticket to the second CA to prove that the first CA is authorized to receive a cross-certificate from the second CA.

8. The method of claim 1, wherein issuing the cross-certificate to the first CA also involves communicating a root certificate for the second CA to the first CA.

9. The method of claim 1, wherein the first CA maintains a certificate revocation list (CRL), which is accessible by devices in the second PKI domain, thereby enabling the first CA to revoke credentials for devices in the first PKI domain, and wherein the revocations are visible to devices in the second PKI domain.

10. A computer-readable storage medium storing instructions that when executed by a computer cause the computer to perform a method for using a portable security token to facilitate cross-certification between a first certification authority (CA) and a second CA, the method comprising:

using the portable security token to transfer certification information between the first CA and the second CA, wherein the first CA and associated subscriber devices constitute a first public-key infrastructure (PKI) domain, wherein the second CA and associated subscriber devices constitute a second PKI domain, and wherein the portable security token communicates with the first CA and the second CA through a location-limited communication channel;

using the certification information to issue a cross-certificate to the first CA signed by the second CA; and propagating the cross-certificate from the first CA to associated subscriber devices in the first PKI domain, thereby allowing the associated subscriber devices in the first PKI domain to authenticate themselves to devices in the second PKI domain.

11. The computer-readable storage medium of claim 10, wherein the method further comprises:

using the certification information to issue a cross-certificate to the second CA signed by the first CA; and propagating the cross-certificate from the second CA to associated subscriber devices in the second PKI domain, thereby allowing the associated subscriber devices in the second PKI domain to authenticate themselves to devices in the first PKI domain.

12. The computer-readable storage medium of claim 10, wherein the cross-certificate issued to the first CA delegates limited access rights to devices in the first PKI domain during interactions with devices in the second PKI domain.

13. The computer-readable storage medium of claim 10, wherein using the portable security token to transfer certification information between the first CA and the second CA involves, installing the public key of the first CA on the portable security token, moving the portable security token in close physical proximity to the second CA, and communicating the public key of the first CA to the second CA through the location-limited communication channel; and wherein using the certification information to issue a cross-certificate to the first CA involves, creating the cross-certificate at the second CA by using the private key of the second CA to sign the public key of the first CA, and communicating the cross-certificate from the second CA to the first CA.

14. The computer-readable storage medium of claim 10, wherein using the portable security token to transfer certification information between the first CA and the second CA involves, installing the private key of the second CA on the portable security token, and moving the portable security token in close physical proximity to the first CA; and wherein using the certification information to issue a cross-certificate to the first CA involves, receiving the public key of the first CA at the portable security token through the location-limited communication channel, creating the cross-certificate at the portable security token by signing the public key of the first CA with the private key of the second CA, and communicating the cross-certificate from the portable security token to the first CA.

15. The computer-readable storage medium of claim 10, wherein using the portable security token to transfer certification information between the first CA and the second CA involves, causing the second CA and the portable security token to agree upon a secret key, and bringing the portable security token in close physical proximity to the first CA; and wherein using the certification information to issue a cross-certificate to the first CA involves, receiving an authenticator for the first CA at the portable security token through the location-limited communication channel, forming a ticket by signing the authenticator with the secret key previously agreed upon by the portable security token and the second CA, and communicating the ticket from the portable security token to the first CA, whereby the first CA can subsequently present the ticket to the second CA to prove that the first CA is authorized to receive a cross-certificate from the second CA.

16. The computer-readable storage medium of claim 10, wherein using the portable security token to transfer certification information between the first CA and the second CA involves, causing the portable security token to receive a digital certificate issued by the second CA, and bringing the portable security token in close physical proximity to the first CA; and wherein using the certification information to issue a cross-certificate to the first CA involves, receiving an authenticator for the first CA at the portable security token through the location-limited communication channel, forming a ticket by signing the authenticator with a private key of the PST, which is associated with the digital certificate, and communicating the ticket from the portable security token to the first CA, whereby the first CA can subsequently present the ticket to the second CA to prove that the first CA is authorized to receive a cross-certificate from the second CA.

17. The computer-readable storage medium of claim 10, wherein issuing the cross-certificate to the first CA also involves communicating a root certificate for the second CA to the first CA.

18. The computer-readable storage medium of claim 10, wherein the first CA maintains a certificate revocation list (CRL), which is accessible by devices in the second PKI domain, thereby enabling the first CA to revoke credentials for devices in the first PKI domain, and wherein the revocations are visible to devices in the second PKI domain.

19. An apparatus that uses a portable security token to facilitate cross-certification between a first certification authority (CA) and a second CA, comprising:
a portable security token configured to transfer certification information between the first CA and the second CA, wherein the first CA and associated subscriber devices constitute a first public-key infrastructure (PKI) domain, wherein the second CA and associated subscriber devices constitute a second PKI domain, and wherein the portable security token communicates with the first CA and the second CA through a location-limited communication channel;
a certificate issuing mechanism configured to use the certification information to issue a cross-certificate to the first CA signed by the second CA; and
a propagation mechanism within the first PKI domain configured to propagate the cross-certificate from the first CA to associated subscriber devices in the first PKI domain, thereby allowing the associated subscriber devices in the first PKI domain to authenticate themselves to devices in the second PKI domain.

20. The apparatus of claim 19, further comprising:
a second certification mechanism is configured to use the certification information to issue a cross-certificate to the second CA signed by the first CA; and
a second propagation mechanism configured to propagate the cross-certificate from the second CA to associated subscriber devices in the second PKI domain, thereby allowing the associated subscriber devices in the second PKI domain to authenticate themselves to devices in the first PKI domain.

21. The apparatus of claim 19, wherein the cross-certificate issued to the first CA delegates limited access rights to devices in the first PKI domain during interactions with devices in the second PKI domain.

22. The apparatus of claim 19,
wherein the portable security token is configured to,
receive the public key of the first CA, and to
communicate the public key of the first CA to the second CA through the location-limited communication channel; and
wherein the certificate issuing mechanism is configured to,
create the cross-certificate at the second CA by using the private key of the second CA to sign the public key of the first CA, and to
communicate the cross-certificate from the second CA to the first CA.

23. The apparatus of claim 19,
wherein the portable security is configured to,
receive the private key of the second CA on the portable security token, and to
receive the public key of the first CA through the location-limited communication channel; and
wherein the certificate issuing mechanism is configured to,
creating the cross-certificate at the portable security token by signing the public key of the first CA with the private key of the second CA, and
communicating the cross-certificate from the portable security token to the first CA.

24. The apparatus of claim 19,
wherein the portable security is configured to,
agree upon a secret key with the second CA, and to
receive an authenticator for the first CA through the location-limited communication channel; and
wherein the certificate issuing mechanism is configured to,
form a ticket by signing the authenticator with the secret key previously agreed upon by the portable security token and the second CA, and to
communicate the ticket from the portable security token to the first CA, whereby the first CA can subsequently present the ticket to the second CA to prove that the first CA is authorized to receive a cross-certificate from the second CA.

25. The apparatus of claim 19,
wherein the portable security is configured to,
receive a digital certificate issued by the second CA, and to
receive an authenticator for the first CA through the location-limited communication channel; and
wherein the certificate issuing mechanism is configured to,
form a ticket by signing the authenticator with a private key of the PST, which is associated with the digital certificate, and to
communicate the ticket from the portable security token to the first CA, whereby the first CA can subsequently present the ticket to the second CA to prove that the first CA is authorized to receive a cross-certificate from the second CA.

26. The apparatus of claim 19, wherein the certificate issuing mechanism is also configured to communicate a root certificate for the second CA to the first CA.

27. The apparatus of claim 19, wherein the first CA is configured to maintain a certificate revocation list (CRL), which is accessible by devices in the second PKI domain, thereby enabling the first CA to revoke credentials for devices in the first PKI domain, and wherein the revocations are visible to devices in the second PKI domain.

* * * * *

UNITED STATES PATENT AND TRADEMARK OFFICE
CERTIFICATE OF CORRECTION

PATENT NO. : 7,130,998 B2 Page 1 of 1
APPLICATION NO. : 10/966749
DATED : October 31, 2006
INVENTOR(S) : Dirk Balfanz et al.

It is certified that error appears in the above-identified patent and that said Letters Patent is hereby corrected as shown below:

On the Title Page Item (73) in the Assignee Name, please delete "Palo Alto Research Center Inc.".

On the Title Page Item (73) in the Assignee Name, please insert --Palo Alto Research Center Incorporated--.

Signed and Sealed this

Twelfth Day of August, 2008

JON W. DUDAS
*Director of the United States Patent and Trademark Office*